(12) United States Patent  
Pardavila Salgado

(10) Patent No.: US 9,170,099 B2  
(45) Date of Patent: Oct. 27, 2015

(54) LASER POSITIONER FOR PUNCHING MACHINES

(71) Applicant: MAQUINARIA GEKA, S.A., Oiartzun (ES)

(72) Inventor: Mikel Pardavila Salgado, Oiartzun (ES)

(73) Assignee: MAQUINARIA GEKA, S.A. (ES)

( * ) Notice: Subject to any disclaimer, the term of this patent is extended or adjusted under 35 U.S.C. 154(b) by 126 days.

(21) Appl. No.: 14/135,936

(22) Filed: Dec. 20, 2013

(65) Prior Publication Data

US 2014/0173922 A1 Jun. 26, 2014

(30) Foreign Application Priority Data

Dec. 21, 2012 (ES) .................................. 201231989

(51) Int. Cl.
- *G01B 11/27* (2006.01)
- *B21D 43/00* (2006.01)
- *B23Q 17/24* (2006.01)
- *B21D 28/04* (2006.01)

(52) U.S. Cl.
CPC ............... *G01B 11/27* (2013.01); *B21D 28/04* (2013.01); *B21D 43/003* (2013.01); *B23Q 17/2423* (2013.01)

(58) Field of Classification Search
CPC .. B21D 28/04; B21D 43/003; B23Q 17/2423; G01B 11/27

USPC ............................ 33/286, 626, 628, 638, 644
See application file for complete search history.

(56) References Cited

U.S. PATENT DOCUMENTS

| | | | | |
|---|---|---|---|---|
| 6,467,178 B1* | 10/2002 | Svensson et al. | ............... | 33/286 |
| 2003/0221324 A1* | 12/2003 | Myron et al. | .................. | 33/286 |
| 2005/0172502 A1* | 8/2005 | Sergyeyenko et al. | .......... | 33/286 |
| 2005/0204570 A1* | 9/2005 | Bascom et al. | ................ | 33/286 |
| 2006/0053643 A1* | 3/2006 | Adrian | ............................ | 33/286 |
| 2007/0068020 A1* | 3/2007 | Adrian | ............................ | 33/286 |
| 2007/0271800 A1* | 11/2007 | Hersey et al. | ................... | 33/286 |
| 2008/0110036 A1* | 5/2008 | Chen | ............................... | 33/286 |
| 2008/0276573 A1* | 11/2008 | Abate | ............................. | 53/512 |
| 2010/0071220 A1* | 3/2010 | Thompson et al. | ............. | 33/228 |
| 2010/0170100 A1* | 7/2010 | Weigel | ............................ | 33/520 |
| 2010/0293798 A1* | 11/2010 | Wilson et al. | ................... | 33/286 |
| 2012/0297635 A1* | 11/2012 | Mickow | .......................... | 33/228 |
| 2013/0326892 A1* | 12/2013 | Schorr | ............................ | 33/228 |

* cited by examiner

*Primary Examiner* — G. Bradley Bennett  
(74) *Attorney, Agent, or Firm* — Cantor Colburn LLP

(57) ABSTRACT

Laser positioner for punching machines made up of two laser emitters (6) joined to a support (8) solidly fixed to the punching machine, wherein each laser emitter (6) emits a planar light beam, and has a rotational movement enabled in the direction of the emitted light beam (7), in such a way that the intersection of the two planar light beams (7) forms a line of intersection coinciding with the axis of action of the punch (4) of the punching machine.

5 Claims, 2 Drawing Sheets

LASER POSITIONER FOR PUNCHING MACHINES

OBJECT OF THE INVENTION

The present invention relates to a laser positioner applied to punching machines, which facilitates the positioning in the punching machine of the workpiece to be punched. The position of the centre of the punch is defined by a laser line that on striking the surface of the workpiece to be punched marks with total precision and simplicity the location where the punching will be performed. This line is the intersection of two planar light beams generated by two laser emitters.

TECHNICAL PROBLEM TO BE RESOLVED AND BACKGROUND OF THE INVENTION

In the current state of the art, there are basically two ways of performing punching in a determined position of a workpiece using a punching machine.

One of them is based on regulating the stops existing on millimeter rulers that are mounted on the punching work table. By subsequently supporting the workpiece against these stops the punching can be performed in the regulated position. Using this method, the punching position must be measured on the workpiece and these measurements subsequently conveyed to the millimeter rulers in order to thus calibrate the position. For workpieces wherein the punching is positioned on the plane of the workpiece it would not be necessary to measure on the workpiece, and only to convey the measurements of the plane to the millimeter rulers.

The other way consists of marking on the workpiece the position where the punching is required. To do this, this point is centre punched outside of the machine and is subsequently punched, by making the tip of the punch coincide with the marking that has been centre punched on the workpiece. This procedure involves a process that is just as complex as the punching itself, meaning that the accuracy in the position of the centre punching marks the precision of the process. At the same time the need for additional machinery makes it of little interest also from a economic point of view.

In short, both methods described are fairly cumbersome, slow and counter-intuitive, making the manufacture of workpieces that require the punching process an activity that is too painstaking and furthermore unprofitable.

By means of the present invention, the positioning of the workpiece is fast and simple, and the correct positioning of the workpiece can be appreciated at first sight, the process moreover being of a very low cost.

DESCRIPTION OF THE INVENTION

The invention relates to a laser positioner for punching machines made up of two laser emitters joined to a detachable support solidly fixed to the punching machine, wherein each laser emitter emits a planar light beam and has a rotational movement enabled in the direction of the emitted light beam, in such a way that the intersection between the two planar beams of light forms a line of intersection coinciding with the axis of action of the punch of the punching machine.

The laser emitters are enabled to rotate in such a way that the line of intersection of the planar beams that they emit coincides with a notch previously made by the punch on a reference test piece, located in a matrix of the punching machine and that serves to calibrate the laser emitters. Once calibrated, their position is fixed using studs that block their rotation.

The laser emitters are powered by a direct current electric battery integrated in the support and are fitted with a switch for turning them on and off.

BRIEF DESCRIPTION OF THE DRAWINGS

To complement the invention being described and with a view to contributing towards a better understanding of the characteristics thereof, according to a preferred example of embodiment of same, a set of drawings is attached where, by way of illustration and not limitation, the following figures are represented.

Figure 1:
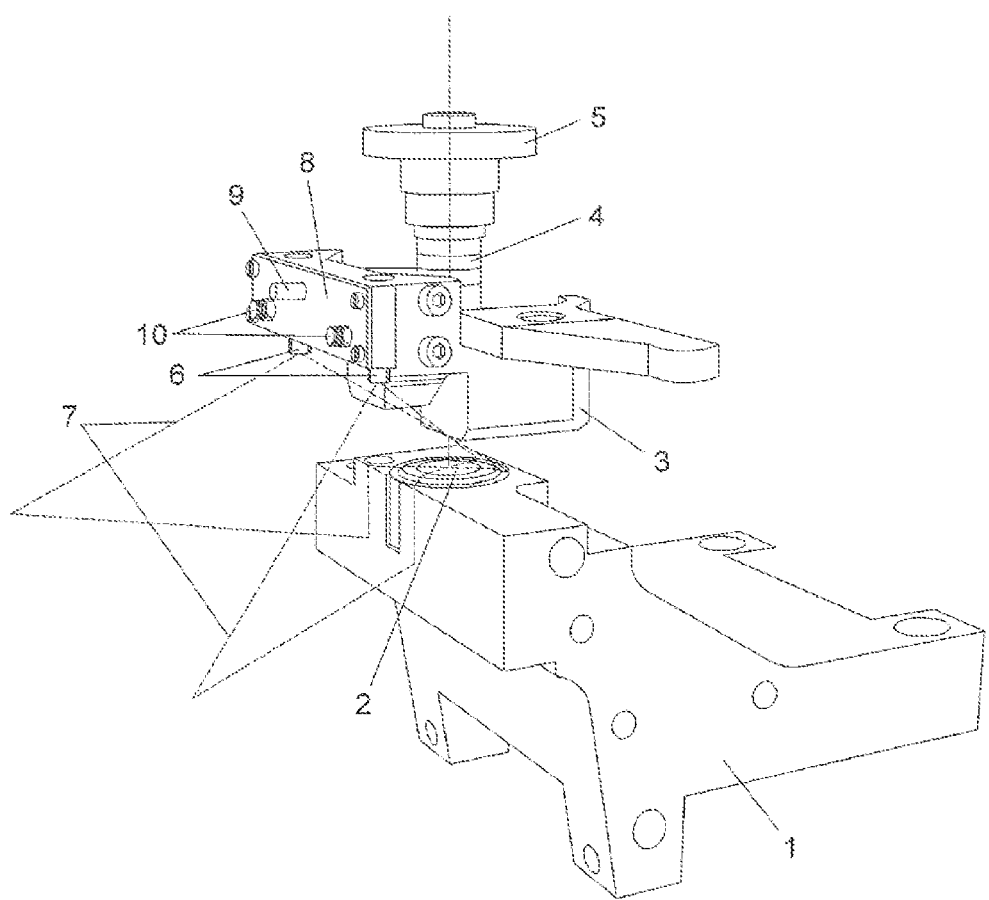
FIG. 1 represents a view in perspective of the punching machine together with the support where the laser emitters are located.
Figure 2:
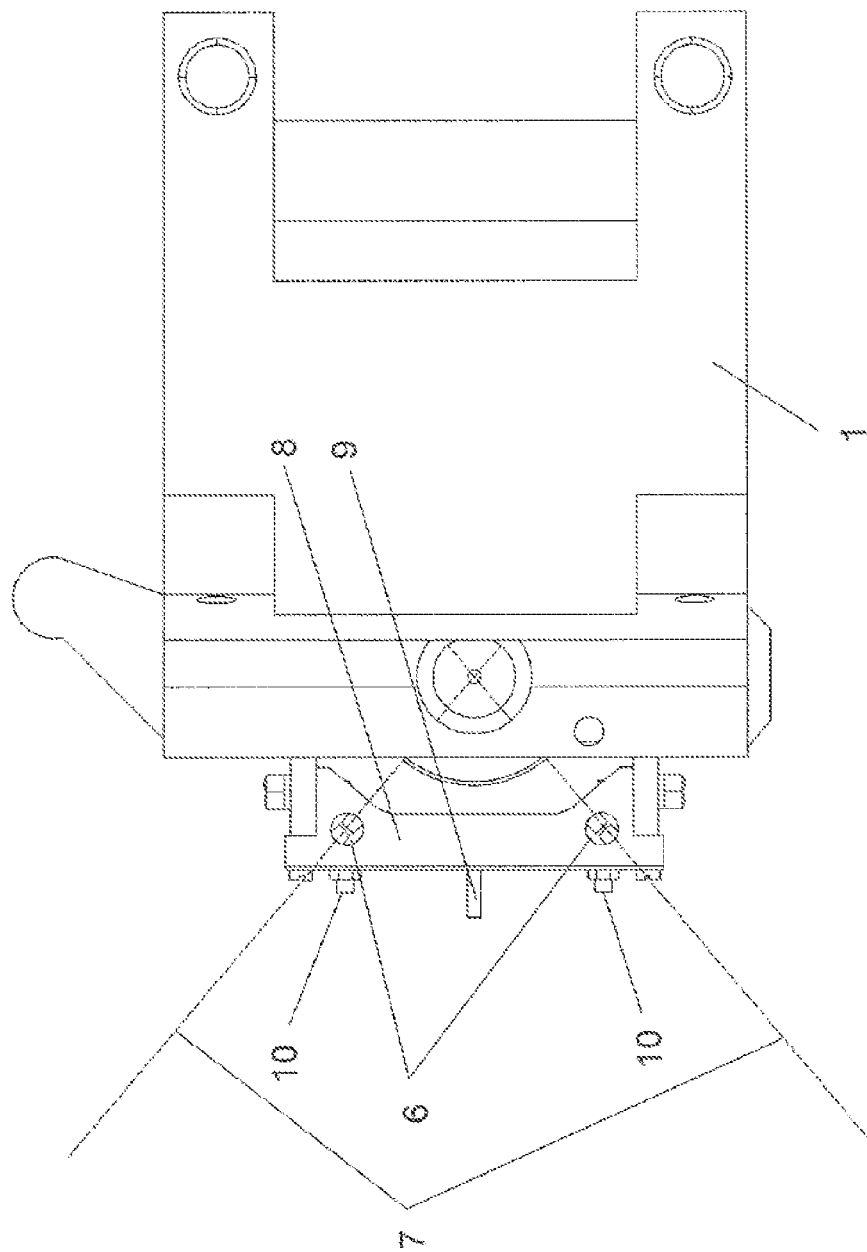
FIG. 2 represents a bottom plan view of the punching machine.

Next is a list of the numerical references used in the figures:
1. Work bench
2. Matrix
3. Punch stop
4. Punch
5. Punch holder
6. Laser emitter
7. Light beam
8. Support
9. Switch
10. Studs

DESCRIPTION OF A PREFERRED EMBODIMENT OF THE INVENTION

The present invention describes a laser positioner that marks on the workpiece to be processed the position of the centre of a punch (4), irrespective of the thickness of the workpiece, offering users of punching machines a fast, effective and intuitive tool.

The workpiece to be punched can be moved easily in such a way that its positioning does not require any additional action, and can be carried out quickly and with high precision.

The positioner of the present invention comprises two laser emitters (6) housed in a support (8) that is coupled solidly to the punch stop (3) of the punching machine, the laser emitters (6) being enabled to have movement around the axis of the beam of light.

In general, it is possible to use conventional laser emitters (6) that emit a linear beam of light. A beam expander, also known in the state of the art, is coupled to these emitters (6), through which the linear beam becomes a planar beam, in such a way that the laser emitters (6) emit planar beams of light (7).

The laser emitters (6) must be calibrated initially with the punching machine. For calibration, a test piece or test plate is positioned on the matrix (2) of the punching machine and the punch (4) is lowered until it makes a slight notch on the plate. This notch corresponds to the centre of the punch.

Subsequently, the laser emitters (6) are manually adjusted by rotating them until the two planar beams (7) cross at the point defined by the notch made.

In this way, the two planar beams (7) emitted cross at a line of intersection that corresponds to the axis of action of the punch (4) of the punching machine. This line strikes the surface of the workpiece, marking the point on which the punching is desired to be performed.

As described, the point on which the punching is performed is the intersection on the surface of the workpiece to be processed of the line formed by the intersection of the two planar beams (7) emitted by the laser emitters (6), the procedure being valid for workpieces of any thickness without the need to recalibrate the position of the two laser emitters (6) every time the model of the workpiece to be punched is changed.

Once the laser emitters (6) have been calibrated, they are fixed on the support (8) by using studs (10).

The two laser emitters (6) are powered by a direct current electric battery integrated in the support (8) and are fitted with a switch (9) for turning them on and off.

The present invention should not be considered limited to the mode of embodiment described herein. Other configurations may be embodied by persons skilled in the art, in the light of the present description. Consequently, the scope of the invention is defined by the following claims.

The invention claimed is:

1. Laser positioner for punching machines characterised in that it comprises:
    a support (8) solidly fixed to the punching machine,
    two laser emitters (6) joined to the support (8) each one of them with a rotational movement enabled in the direction of the emitted light beam (7), which emit planar light beams (7),
in such a way that the planar light beams (7) are positioned so that the line of intersection that they form when crossing coincides with the axis of action of the punch of the punching machine.

2. Laser positioner for punching machines according to claim 1, characterised in that the laser emitters (6) are enabled to rotate in such a way that the line of intersection of the planar beams (7) that they emit coincides with a notch made by the punch (4) on a reference test piece located in a matrix (2) of the punching machine and that serves to calibrate the laser emitters (6).

3. Laser positioner for punching machines according to claim 1, characterised in that the support (8) is detachable from the punching machine.

4. Laser positioner for punching machines according to claim 1, characterised in that it comprises studs (10) that block the rotation of the laser emitters (6).

5. Laser positioner for punching machines according to claim 1, characterised in that the laser emitters (6) are powered by a direct current electric battery integrated in the support (8) and are fitted with a switch (9) for turning them on and off.

\* \* \* \* \*